(No Model.) 2 Sheets—Sheet 2.
E. B. WEED.
ELECTRODE FOR SECONDARY BATTERIES.
No. 440,210. Patented Nov. 11, 1890.
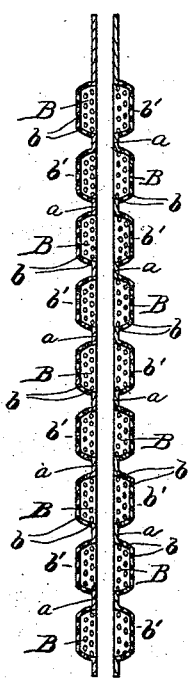
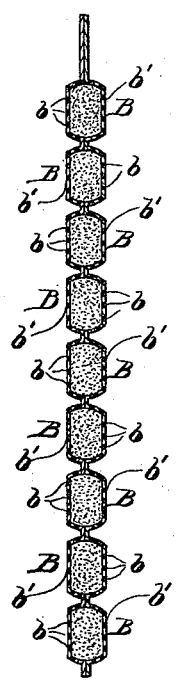
Attest
M. M. Wiles
N. E. Spencer
Inventor,
Edward B. Weed,
By John E. Wiles,
his Attorney,

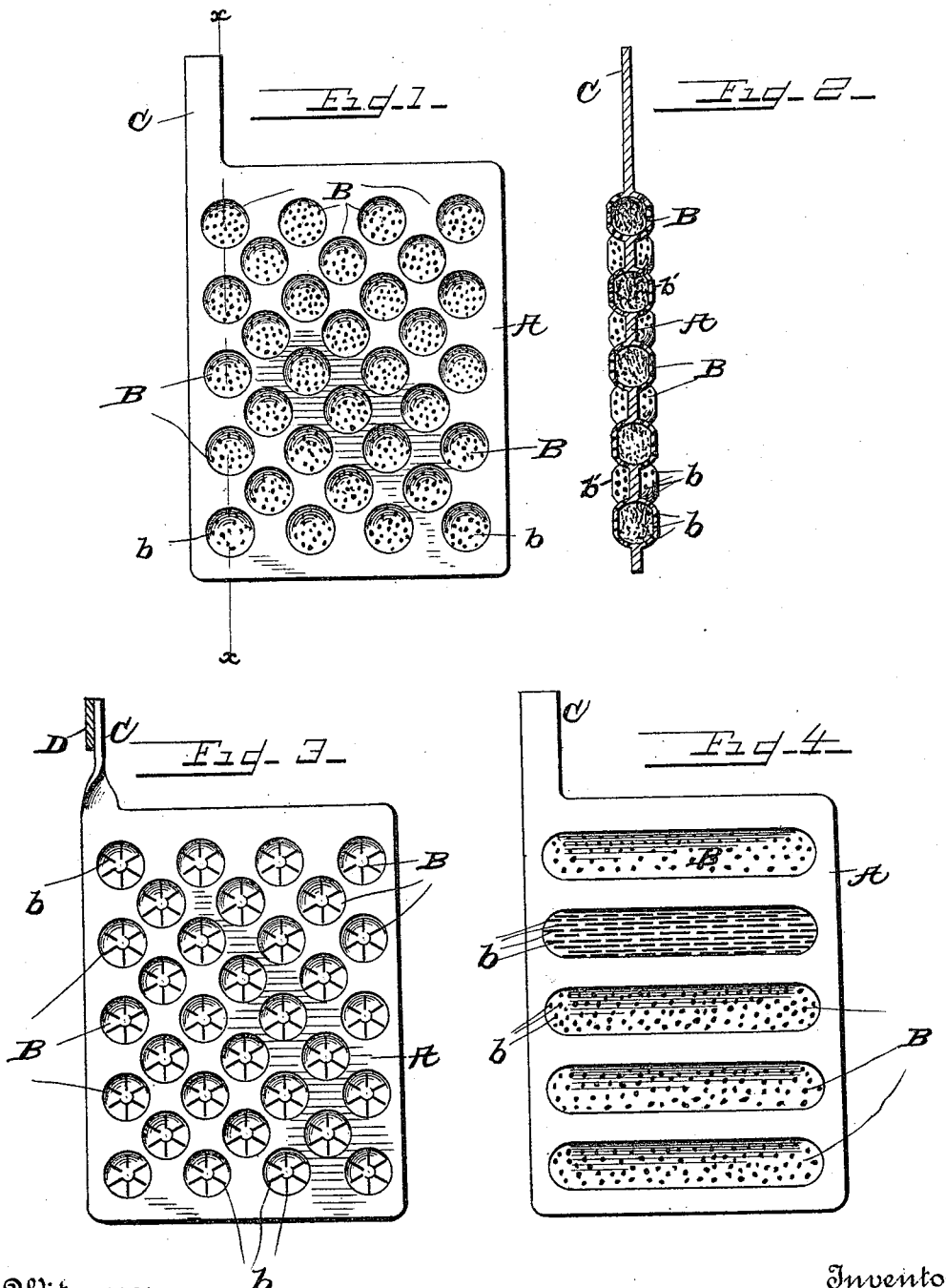

UNITED STATES PATENT OFFICE.

EDWARD B. WEED, OF DETROIT, MICHIGAN, ASSIGNOR TO JOHN E. WILES, OF SAME PLACE.

ELECTRODE FOR SECONDARY BATTERIES.

SPECIFICATION forming part of Letters Patent No. 440,210, dated November 11, 1890.

Application filed February 8, 1890. Serial No. 339,738. (No model.)

*To all whom it may concern:*

Be it known that I, EDWARD B. WEED, a citizen of the United States, residing at Detroit, county of Wayne, State of Michigan, have invented a certain new and useful Improvement in Electrodes for Secondary Batteries; and I declare the following to be a full, clear, and exact description of the invention, such as will enable others skilled in the art to which it pertains to make and use the same, reference being had to the accompanying drawings, which form a part of this specification.

My invention relates to certain new and useful improvements in electrodes for secondary batteries.

The objects of my invention are, first, to provide an improved electrode for secondary batteries so constructed as to permit a large amount of active material or material to become active to be placed in receptacles formed in the metallic plate or support, while the weight of said metallic plate is comparatively small; second, to provide in an electrode for secondary batteries receptacles for the active material or material to become active, so constructed as to permit the masses of said active material contained therein to expand freely without stretching or straining the plate, and, third, to provide means for the admission of the electrolyte to the interior of the receptacles so as to thoroughly saturate the active material and also to permit the circulation of the electrolyte through and around said masses of active material.

The various features of my invention will be more fully set forth and described in the following specification and claims.

Referring to the accompanying drawings, Figure 1 is a side elevation of my improved form of electrode. Fig. 2 is a central vertical section through the same on line $x\ x$, Fig. 1. Fig. 3 represents a modified form of my improved electrode. Fig. 4 represents another modification. Fig. 5 is a sectional view representing two sheets of metal formed so as to produce halves of the plate preparatory to being united together. Fig. 6 is a similar view representing the sheets united together.

A represents the plate.

B represents receptacles for the active material or material to become active.

$b$ represents slots or perforations through the metallic shell or cover of the receptacles B.

C represents the terminal, and D the conducting-bar.

It will be seen by reference to the drawings that the receptacles B are formed so as to wholly inclose the masses of active material. By this construction the active material is held permanently in the receptacles and prevented from forcing itself out of said receptacles by its own expansion, or being washed out by the agitation of the liquid in the cell, or from being shaken or jarred out by vibration such as is occasioned by railroad or street-car service.

In order to provide for the expansion of the masses of active material, the receptacles B are flattened or indented, as shown at $b'$, so that as the active material expands the shell of the receptacle will straighten out or become slightly rounded without in any way straining or stretching the body of the plate.

In practice it is found convenient to form the plates in halves from sheet metal, the same being punched so as to form the receptacles B and the intermediate plane surfaces $a$, and properly slotted or perforated, as shown, and the two halves then filled and then united together in any suitable manner at each of said plane surfaces, so as to inclose the masses of active material or material to become active and securely confine the same in the receptacles. The halves of the plates may be made of any desired thickness of metal, and the receptacles B may be made of any desired size and shape, and may be placed closer together or farther apart, as may be desired. In this manner the amount of active material contained in the receptacles and in the plates may be regulated as desired. So, also, by the construction of the receptacles as described the electrolyte is given full access to the active material in the receptacles, and is permitted to circulate through said receptacles and to thoroughly saturate the masses of active material.

In the form shown in Fig. 3 the receptacles

B are slotted instead of perforated, while in the form shown in Fig. 4 the form of said receptacles is varied, the same extending preferably in a horizontal position across the face of the plate. In both these forms, however, the effect is precisely the same as in the form shown in Fig. 1.

It may be found convenient to cast the plates in one piece with the receptacles formed so as to be filled from the outside and then closed up, so as to confine the active material therein, the work of joining the two halves being thereby saved.

It will be seen that by the construction of the electrodes as shown and described the greatest possible amount of active material may be placed in plates of the lightest possible weight. In this manner an extremely-efficient battery is constructed, and one which is also durable and at the same time cheap to manufacture.

Of course various modifications of the details of construction may be made, and any form of device of this nature having projecting or overhanging receptacles for the active material, said receptacles being formed so as to wholly inclose the masses of active material and being slotted or perforated to permit the admission of the electrolyte, I would regard as coming within the scope of my original invention.

Having thus described my invention, what I claim as new, and desire to secure by Letters Patent of the United States, is—

1. An electrode for secondary batteries, consisting of a metallic supporting-plate having outwardly-projecting receptacles for the active material or material to become active, said receptacles being formed so as to wholly inclose the masses of active material and being indented or flattened, substantially as described.

2. An electrode for secondary batteries, consisting of a metallic supporting-plate formed from two sheets of metal, said sheets made with indentations or corrugations and intermediate plane surfaces and united together at each of said plane surfaces, substantially as described.

In testimony whereof I sign this specification in the presence of two witnesses.

EDWARD B. WEED.

Witnesses:
JOHN E. WILES,
HERMAN FREEDNAN.